United States Patent
Park et al.

(10) Patent No.: US 10,804,538 B2
(45) Date of Patent: Oct. 13, 2020

(54) SELF-ASSEMBLED COMPOSITE OF CARBON NITRIDE AND GRAPHENE OXIDE, MANUFACTURING METHOD FOR SAME, POSITIVE ELECTRODE HAVING SAME APPLIED THERETO, AND LITHIUM-SULFUR BATTERY COMPRISING SAME

(71) Applicant: LG CHEM, LTD., Seoul (KR)

(72) Inventors: Ji Hee Park, Daejeon (KR); Kwon Nam Sohn, Daejeon (KR); Doo Kyung Yang, Daejeon (KR); Ki Young Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 291 days.

(21) Appl. No.: 15/743,227

(22) PCT Filed: Jan. 25, 2017

(86) PCT No.: PCT/KR2017/000916
§ 371 (c)(1),
(2) Date: Jan. 9, 2018

(87) PCT Pub. No.: WO2017/213325
PCT Pub. Date: Dec. 14, 2017

(65) Prior Publication Data
US 2018/0212248 A1    Jul. 26, 2018

(30) Foreign Application Priority Data
Jun. 8, 2016 (KR) .................. 10-2016-0071216

(51) Int. Cl.
*H01M 4/62* (2006.01)
*H01M 10/052* (2010.01)
(Continued)

(52) U.S. Cl.
CPC ......... *H01M 4/628* (2013.01); *C01B 21/0605* (2013.01); *C01B 21/082* (2013.01);
(Continued)

(58) Field of Classification Search
CPC .... C01B 32/198; C01B 21/082; H01M 4/133; H01M 4/5815; H01M 2004/028;
(Continued)

(56) References Cited

U.S. PATENT DOCUMENTS

2016/0233487 A1    8/2016 Jun et al.

FOREIGN PATENT DOCUMENTS

CN    103539101 A        1/2014
CN    103861632 A  *     6/2014
(Continued)

OTHER PUBLICATIONS

Machine Translation by Liu Yipu (CN 103861632A) "Preparation Method for Multi-hole Carbon Nitride Photocatalytic Material doped with Sulphur", pp. 1-9, 2014. (Year: 2014).*
(Continued)

*Primary Examiner* — Stewart A Fraser
(74) *Attorney, Agent, or Firm* — Birch, Stewart, Kolasch & Birch, LLP (57) ABSTRACT

The present invention relates to a self-assembled composite of carbon nitride and graphene oxide, and in particular, to including a self-assembled composite prepared by heat treating a mixed solution dissolving melamine, tri-thiocyanuric acid and graphene oxide (GO) in a positive electrode of a lithium-sulfur battery to suppress elution of lithium polysulfide. According to the present invention, the self-assembled composite containing a pyridinic group in large quantities and having improved conductivity adsorbs lithium polysulfide eluted from a positive electrode during charge and discharge and performs a role of preventing (Continued)

diffusion of the lithium polysulfide, and therefore, lithium-sulfur battery capacity and lifecycle properties can be enhanced by suppressing a shuttle reaction.

10 Claims, 10 Drawing Sheets

(51) Int. Cl.
<table>
<tr><td>C01B 32/198</td><td>(2017.01)</td></tr>
<tr><td>C01B 21/06</td><td>(2006.01)</td></tr>
<tr><td>H01M 4/136</td><td>(2010.01)</td></tr>
<tr><td>H01M 4/58</td><td>(2010.01)</td></tr>
<tr><td>H01M 4/133</td><td>(2010.01)</td></tr>
<tr><td>H01M 4/587</td><td>(2010.01)</td></tr>
<tr><td>C01B 21/082</td><td>(2006.01)</td></tr>
<tr><td>C01B 32/182</td><td>(2017.01)</td></tr>
<tr><td>H01M 4/02</td><td>(2006.01)</td></tr>
</table>

(52) U.S. Cl.
CPC .......... *C01B 32/182* (2017.08); *C01B 32/198* (2017.08); *H01M 4/133* (2013.01); *H01M 4/136* (2013.01); *H01M 4/587* (2013.01); *H01M 4/5815* (2013.01); *H01M 10/052* (2013.01); *C01P 2006/40* (2013.01); *H01M 2004/028* (2013.01); *H01M 2300/0037* (2013.01)

(58) Field of Classification Search
CPC ...... H01M 4/62; H01M 4/628; H01M 10/052; Y02P 70/54
See application file for complete search history.

(56) References Cited

FOREIGN PATENT DOCUMENTS

<table>
<tr><td>CN</td><td>103985875 A</td><td>8/2014</td></tr>
<tr><td>CN</td><td>108470890 A</td><td>8/2018</td></tr>
<tr><td>EP</td><td>2 687 483 A1</td><td>1/2014</td></tr>
<tr><td>KR</td><td>10-2012-0028457 A</td><td>3/2012</td></tr>
<tr><td>KR</td><td>10-1211949 B1</td><td>12/2012</td></tr>
<tr><td>KR</td><td>10-2013-0134797 A</td><td>12/2013</td></tr>
<tr><td>KR</td><td>10-1486658 B1</td><td>1/2015</td></tr>
<tr><td>KR</td><td>10-1640545 B1</td><td>7/2016</td></tr>
</table>

OTHER PUBLICATIONS

Chen et al., "Conductive Lewis Base Matrix to Recover the Missing Link of $Li_2S_8$ during the Sulfur Redox Cycle in Li—S Battery", Chemistry of Materials, ACS Publications, American Chemical Society, total of 8 pages.
Choi et al., "Self-Assembly of Hydrogen-Bonded Polymeric Rods Based on the Cyanuric Acid•Melamine Lattice", Chem. Mater. 1999, 11, pp. 684-690.
Feng et al., "Nanoporous sulfur-doped graphitic carbon nitride microrods: A durable catalyst for visible-light-driven $H_2$ evolution", International Journal of Hydrogen Energy 39 (2014), pp. 15373-15379.
International Search Report for PCT/KR2017/000916 (PCT/ISA/210) dated May 1, 2017.
Jun et al., "From Melamine-Cyanuric Acid Supramolecular Aggregates to Carbon Nitride Hollow Spheres", Advanced Functional Materials, 2013, 23, pp. 3661-3667.
Jun et al., "Three-Dimensional Macroscopic Assemblies of Low-Dimensional Carbon Nitrides for Enhanced Hydrogen Evolution", Angew. Chem. 2013, 125, pp. 1-6.
Liu et al., "A Graphene-like Oxygenated Carbon Nitride Material for Improved Cycle-life Lithium/Sulfur Batteries", ACS Publications, pp. 1-18.
Ma et al., "Determinants of Cyanuric Acid and Melamine Assembly in Water", ACS Publications, American Chemical Society, total of 13 pages.
Song et al., "Advanced Sulfur Cathode Enabled by Highly Crumpled Nitrogen-Doped Graphene Sheets for High-Energy-Density Lithium-Sulfur Batteries", ACS Publications, 2015 American Chemical Society, Nano Lett., 2016, 16 (2), pp. 864-870.
Song et al., "Nitrogen-Doped Mesoporous Carbon Promoted Chemical Adsorption of Sulfur and Fabrication of High-Areal-Capacity Sulfur Cathode with Exceptional Cycling Stability for Lithium-Sulfur Batteries", Advanced Functional Materials, 2014, 24, pp. 1243-1250.
Wang et al., "Self-Assembled Microwires of Aromatic Acids and Melamine", International Journal of Nano Studies & Technology (IJNST) ISSN 2167-8685, 2012, pp. 1-7.
Wieghold et al., "Photoresponse of supramolecular self-assembled networks on graphene-diamond interfaces", Nature Communications 7, Article No. 10700 (2016), pp. 1-8.
Yun et al., "Free-standing graphene-based nanohybrid paper electrode as an anode for lithium-ion batteries", RSC Adv., 2014, 4, pp. 38310-38315.
European Search Report for Appl. No. 17810448.5 dated Jun. 15, 2018.

\* cited by examiner

SELF-ASSEMBLED COMPOSITE OF CARBON NITRIDE AND GRAPHENE OXIDE, MANUFACTURING METHOD FOR SAME, POSITIVE ELECTRODE HAVING SAME APPLIED THERETO, AND LITHIUM-SULFUR BATTERY COMPRISING SAME

This application claims priority to and the benefits of Korean Patent Application No. 10-2016-0071216, filed with the Korean Intellectual Property Office on Jun. 8, 2016, the entire contents of which are incorporated herein by reference.

TECHNICAL FIELD

The present invention relates to a self-assembled composite of carbon nitride and graphene oxide, and in particular, to including a self-assembled composite prepared by heat treating a mixed solution dissolving melamine, trithiocyanuric acid and graphene oxide (GO) in a positive electrode of a lithium-sulfur battery to suppress elution of lithium polysulfide.

BACKGROUND ART

As electronic goods, electronic devices, communication devices and the like have rapidly become smaller and lighter recently, and necessity of electric vehicles has highly emerged regarding environmental problems, demands for improving performance of secondary batteries used as a power source of these goods have greatly increased. Among these, lithium secondary batteries have received considerable attention as a high performance battery due to their high energy density and high standard electrode potential.

Particularly, lithium-sulfur (Li—S) batteries are a secondary battery using a sulfur series material having sulfur-sulfur (S—S) bonds as a positive electrode active material, and using lithium metal as a negative electrode active material. Sulfur, a main material of the positive electrode active material, has advantages of being very abundant in resources, having no toxicity and having a low atomic weight. In addition, a lithium-sulfur battery has theoretical discharging capacity of 1675 mAh/g-sulfur and theoretical energy density of 2,600 Wh/kg, which is very high compared to theoretical energy density of other battery systems (Ni-MH battery: 450 Wh/kg, Li—FeS battery: 480 Wh/kg, Li—MnO$_2$ battery: 1,000 Wh/kg, Na—S battery: 800 Wh/kg) currently studied, and therefore, is a most promising battery among batteries that have been developed so far.

During a discharge reaction of a lithium-sulfur (Li—S) battery, an oxidation reaction of lithium occurs in a negative electrode (anode), and a reduction reaction of sulfur occurs in a positive electrode (cathode). Sulfur has a cyclic S$_8$ structure before discharge, and electric energy is stored and produced using an oxidation-reduction reaction in which an oxidation number of S decreases as S—S bonds are broken during a reduction reaction (discharge), and an oxidation number of S increases as S—S bonds are formed again during an oxidation reaction (charge). During such a reaction, the sulfur is converted to linear-structured lithium polysulfide (Li$_2$S$_x$, x=8, 6, 4 and 2) from cyclic S$_8$ by the reduction reaction, and as a result, lithium sulfide (Li$_2$S) is lastly produced when such lithium polysulfide is completely reduced. By the process of being reduced to each lithium polysulfide, a discharge behavior of a lithium-sulfur (Li—S) battery shows gradual discharging voltages unlike lithium ion batteries.

Among lithium polysulfide such as Li$_2$S$_8$, Li$_2$S$_6$, Li$_2$S$_4$ and Li$_2$S$_2$, lithium polysulfide having a high sulfur oxidation number (Li$_2$S$_x$, commonly x>4) is particularly readily dissolved in a hydrophilic liquid electrolyte. Lithium polysulfide dissolved in the liquid electrolyte is diffused away from a lithium polysulfide-produced positive electrode due to a concentration difference. Lithium polysulfide eluted from the positive electrode as above is washed away out of the positive electrode reaction area making it impossible to be gradually reduced to lithium sulfide (Li$_2$S). In other words, lithium polysulfide present in a dissolved state outside the positive electrode and the negative electrode is not able to participate in charge and discharge reactions of a battery, and therefore, the sulfur material amount participating in an electrochemical reaction in the positive electrode decreases, and as a result, it becomes a main factor causing charging capacity reduction and energy reduction of a lithium-sulfur battery.

Furthermore, apart from those floating or immersed in the liquid electrolyte, lithium polysulfide diffusing to the negative electrode directly reacts with lithium and is fixed on the negative electrode surface in a Li$_2$S form, which causes a problem of corroding the lithium metal negative electrode.

In order to minimize such lithium polysulfide elution, studies on changing morphology of a positive electrode composite forming a composite by loading sulfur particles to various carbon structures or metal oxides have been ongoing.

Among these, nitrogen-doped carbon materials adsorb lithium polysulfide due to changes in the surface polarity, and among various nitrogen functional groups doped on the carbon surface, a pyrrolic group and a pyridinic group have been reported to be effective in adsorbing lithium polysulfide (Chem. Mater., 2015, 27, 2048/Adv. Funct. Mater., 2014, 24, 1243).

Particularly, carbon nitride (C$_3$N$_4$:CN) is a binary compound having a structure in which hexagonal rings spread two dimensionally while carbon and nitrogen are alternately arranged, and contains a pyridinic group advantageous for lithium polysulfide adsorption in large quantities, and is known to suppress lithium polysulfide elution that is a problem in a lithium-sulfur battery (Nano Lett., 2015, 15, 5137). Such carbon nitride may be generally synthesized by heat treating a nitrogen precursor such as urea, dicyandiamide or melamine. However, carbon nitride has low conductivity of $10^{-11}$ S/m, and has a limit to be used as a battery electrode material by itself.

PRIOR ART DOCUMENTS

Korean Patent No. 1347789 "Method for preparing carbon nitride (C3N4)-graphene composite and carbon nitride (C3N4)-graphene composite prepared using the same"

DISCLOSURE

Technical Problem

As described above, a lithium-sulfur battery has had a problem in that battery capacity and lifecycle properties decline as charge and discharge cycles progress due to lithium polysulfide eluted and diffused from a positive electrode. In view of the above, the inventors of the present invention have aimed to develop, as a positive electrode material of a lithium-sulfur battery, a carbon nitride-graphene oxide composite containing a pyridinic group capable of adsorbing lithium polysulfide in large quantities and having improved conductivity.

Accordingly, an aspect of the present invention provides a lithium-sulfur battery suppressing elution and diffusion of lithium polysulfide.

Technical Solution

According to an aspect of the present invention, there is provided a method for preparing a self-assembled composite of carbon nitride (CN) and graphene oxide (GO) prepared by heat treating a mixed solution dissolving melamine, tri-thiocyanuric acid and graphene oxide.

According to another aspect of the present invention, there is provided a self-assembled composite of carbon nitride (CN) and graphene oxide (GO) prepared using the above preparation method.

According to still another aspect of the present invention, there is provided a positive electrode for a lithium-sulfur battery including a self-assembled composite of carbon nitride (CN) and graphene oxide (GO) prepared using the preparation method, and a lithium-sulfur battery including the same.

Advantageous Effects

According to an aspect of the present invention, a self-assembled composite of carbon nitride (CN) and graphene oxide (GO) containing a pyridinic group in large quantities and having improved conductivity adsorbs lithium polysulfide eluted from a positive electrode during charge and discharge and performs a role of preventing diffusion of the lithium polysulfide, and therefore, lithium-sulfur battery capacity and lifecycle properties can be enhanced by suppressing a shuttle reaction.

BEST MODE

Hereinafter, preferred embodiments of the present invention will be described in detail with reference to the accompanying drawings. Such drawings are one embodiment for describing the present invention, and may be implemented in various different forms, and are not limited to the present specification. Herein, in the drawings, parts not relevant to the descriptions are not included, and like reference numerals designate like elements throughout the specification. In addition, sizes and relative sizes of the constituents shown in the drawings are unrelated to actual scales, and may be reduced or exaggerated for clarity of the descriptions.

In the present invention, a self-assembly is a state of melamine and tri-thiocyanuric acid (or adding graphene oxide hereto) bonding through electrostatic attraction without a chemical reaction in a precursor state, whereas a self-assembled composite means melamine, tri-thiocyanuric acid and graphene oxide producing a chemical reaction by heat treatment to form carbon nitride and become a composite with graphene oxide.

The present invention selects, as a method of synthesizing carbon nitride (CN), a method of heat treating melamine and tri-thiocyanuric acid as a precursor, and prepares a self-assembled composite by adding graphene oxide capable of providing conductivity thereto in a mixing process, and provides a positive electrode and a lithium-sulfur battery using such a material having improved conductivity.

In the self-assembled composite of carbon nitride (CN) and graphene oxide (GO) (hereinafter, GO/CN self-assembled composite), an electron transfer ability of the carbon nitride may be supplemented by the graphene oxide, and therefore, catalytic activity for electron transfer of the carbon nitride may be enhanced.

According to the present invention, the GO/CN self-assembled composite may be prepared by heat treating a mixed solution dissolving a precursor material of carbon nitride and graphene oxide. Herein, as the precursor material of carbon nitride, using melamine and tri-thiocyanuric acid is preferred.

When dissolving melamine and tri-thiocyanuric acid in dimethyl sulfoxide (DMSO) and adding water thereto, a self-assembly is formed. The melamine and the tri-thiocyanuric acid forming a self-assembly as above bond through hydrogen bonds and electrostatic attraction, and are also stacked through π-π interactions. When heat treating such a self-assembly of melamine and tri-thiocyanuric acid for 1 hour to 10 hours at 400° C. to 700° C. under inert gas atmosphere such as helium (He), nitrogen ($N_2$), argon (Ar), neon (Ne) or xenon (Xe), rectangular-shaped carbon nitride is formed.

Figure 3:
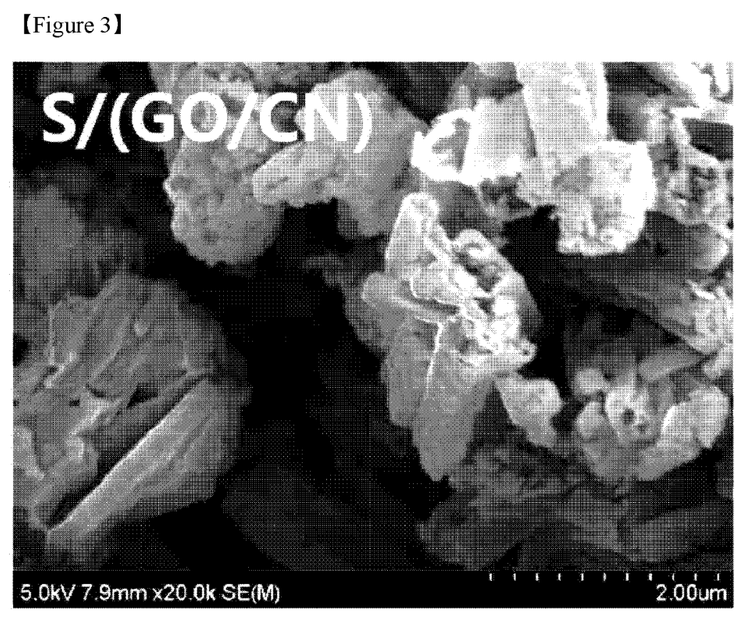
FIG. 3 is a scanning microscope image of a S-(GO/CN) composite according to Example 2 of the present invention.

When dissolving melamine and tri-thiocyanuric acid in DMSO and mixing graphene oxide (GO) dissolved in water thereto using a self-assembly forming principle of melamine and tri-thiocyanuric acid, a self-assembly as shown in FIG. 3 is formed, and when heat treating the self-assembly for 1 hour to 10 hours at 400° C. to 700° C. under the inert gas atmosphere described above in the same manner as the method described above, a nanotube-type GO/CN self-assembled composite may be formed.

More specifically, in the mixed solution dissolving melamine, tri-thiocyanuric acid and graphene oxide, a molar content ratio of the melamine and the tri-thiocyanuric acid being 2:1 to 1:2 is most preferred in forming the self-assembly, however, the present invention is not limited thereto. In addition, in the mixed solution, the graphene oxide is added in the rage of 0.1% by weight to 90% by weight with respect to the weight of the melamine and the tri-thiocyanuric acid, and is preferably added more than the content required to form the GO/CN self-assembled composite. This is due to the fact that graphene oxide remaining after forming the GO/CN self-assembled composite is leaked during washing and filtering processes. The graphene oxide content in the GO/CN self-assembled composite prepared as above may be from 1% by weight to 50% by weight with respect to the total weight of the GO/CN self-assembled composite.

Positive Electrode for Lithium-Sulfur Battery

The GO/CN self-assembled composite provided in one embodiment described above may be simply mixed with sulfur used as a positive electrode active material of a lithium-sulfur battery to be used, or may be used in a composite form. Such a GO/CN self-assembled composite adsorbs lithium polysulfide and resultantly increases discharging capacity and improves an overvoltage property. In addition, an excellent discharging capacity retention rate is exhibited, and high capacity is maintained even after long hours of cycles. Particularly, when the composited form has a structure of coating the GO/CN self-assembled composite surface with sulfur, a contact area between the composited form and the sulfur increases more effectively adsorbing polysulfide.

In a positive electrode, a sulfur series material may include elemental sulfur (S8), sulfur series compounds or mixtures thereof as a positive electrode active material, and these may be composited with a conductor when used. Specifically, the sulfur series compound may be $Li_2S_n$ (n≥1), an organosulfur compound, a carbon-sulfur polymer (($C_2S_x$)$_n$: x=2.5 to 50, n≥2) or the like.

The conductor may be porous. Accordingly, as the conductor, those having porosity and conductivity may be used without limit, and for example, carbon-based materials having porosity may be used. As such carbon-based materials, carbon black, graphite, graphene, active carbon, carbon fiber, carbon nanotubes (CNT) and the like may be used. In addition, metallic fibers such as metal mesh; metallic powders such as copper, silver, nickel and aluminum; or organic conductive materials such as polyphenylene derivatives may also be used. The conductive materials may be used either alone or as a mixture.

As one embodiment, a positive electrode mixture including the GO/CN self-assembled composite is mixed to be prepared to slurry, or as another embodiment, the GO/CN self-assembled composite may be formed to a S-(GO/CN) composite with a sulfur series material and then prepared to slurry. Herein, a mixture mixing the GO/CN self-assembled composite, the sulfur series material and the conductor in a prescribed mixing ratio may be used, and preferably, the GO/CN self-assembled composite is preferably included in 0.5% by weight to 50% by weight with respect to the total positive electrode mixture weight since the content of sulfur, the positive electrode active material, may be secured at a certain level or higher.

The positive electrode slurry may be coated on a current collector, and vacuum dried to form a positive electrode for a lithium-sulfur battery. The slurry may be coated on a current collector to a proper thickness depending on viscosity of the slurry and a thickness of a positive electrode to form, and preferably, may be properly selected within the range of 10 nm to 1 μm.

Herein, the method of coating the slurry is not particularly limited, and examples thereof may include methods of doctor blade coating, dip coating, gravure coating, slit die coating, spin coating, comma coating, bar coating, reverse roll coating, screen coating, cap coating and the like.

The current collector may be generally prepared to have a thickness of 3 μm to 500 μm, and is not particularly limited as long as it has high conductivity without inducing chemical changes to a battery. Specifically, conductive materials such as stainless steel, aluminum, copper or titanium may be used, and more specifically, a carbon-coated aluminum current collector may be used. Using carbon-coated aluminum substrate have advantages compared to those without carbon coating in that adhesion strength for the active material is excellent, contact resistance is low, and corrosion of aluminum caused by polysulfide may be prevented. As the current collector, various forms such as films, sheets, foil, nets, porous materials, foam or nonwoven fabric materials may be used.

Lithium-Sulfur Battery

The positive electrode for a lithium-sulfur battery; a negative electrode including lithium metal or a lithium alloy as a negative electrode active material; a separator located between the positive electrode and the negative electrode; and an electrolyte impregnated in the negative electrode, the positive electrode and the separator, and including a lithium salt and an organic solvent may be included.

The negative electrode may use a material capable of reversibly intercalating or deintercalating lithium ions ($Li^+$), a material capable of reversibly forming a lithium-containing compound by reacting with lithium ions, lithium metal or a lithium alloy as the negative electrode active material. Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions ($Li^+$) may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), silicon (Si) and tin (Sn).

In addition, during a process of charging and discharging the lithium-sulfur battery, sulfur used as the positive electrode active material may be changed to an inactive material and attached on the lithium negative electrode. Such inactive sulfur means sulfur that has gone through various electrochemical or chemical reactions and is in a state of not being able to participate in an electrochemical reaction of the positive electrode any more, and the inactive sulfur formed on the lithium negative electrode surface also has an advantage of performing a role of a protective layer of the lithium negative electrode.

A common separator may be provided between the positive electrode and the negative electrode. The separator is a physical separator having a function of physically separating electrodes, and those commonly used as a separator may be used without particular limit, and particularly, those having an excellent electrolyte moisture retention ability while having low resistance for ion migration of the electrolyte are preferred.

In addition, the separator enables lithium ion transfer between the positive electrode and the negative electrode while separating and insulating the positive electrode and the negative electrode from each other. Such a separator may be formed with porous, and non-conductive or insulating materials. The separator may be an independent member such as a film, or a coating layer added to the positive electrode and/or the negative electrode.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

The electrolyte impregnated in the positive electrode, the negative electrode and the separator is a non-aqueous electrolyte containing a lithium salt, and is formed with a lithium salt and a liquid electrolyte, and in addition thereto, an organic solid electrolyte, an inorganic solid electrolyte or the like is used.

The lithium salt of the present invention is a material favorable to be dissolved in a non-aqueous organic solvent, and examples thereof may include one or more selected from the group consisting of LiCl, LiBr, LiI, LiClO$_4$, LiBF$_4$, LiB$_{10}$Cl$_{10}$, LiB(Ph)$_4$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiNO$_3$, chloroborane lithium, lower aliphatic carboxylic acid lithium, lithium tetraphenylborate and lithium imide.

The concentration of the lithium salt may be from 0.2 M to 4 M, specifically from 0.3 M to 2 M, and more specifically from 0.3 M to 1.5 M depending on various factors such as an accurate composition of the electrolyte mixture, solubility of the salt, conductivity of the dissolved salt, charge and discharge conditions of a battery, a working temperature, and other factors known in the lithium battery field. When used in less than 0.2 M, conductivity of the electrolyte may decrease causing decline in the electrolyte performance, and when used in greater than 4 M, viscosity of the electrolyte increases leading to a decrease in the lithium ion (Li$^+$) mobility.

The non-aqueous organic solvent needs to favorably dissolve the lithium salt, and examples of the non-aqueous organic solvent of the present invention may include aprotic organic solvents such as diethylene glycol dimethyl ether, N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxy ethane, tetrahydroxy franc, 2-methyl tetrahydrofuran, dimethyl sulfoxide, 1,3-dioxolane, 4-methyl-1,3-dioxene, diethyl ether, formamide, dimethylformamide, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate, and the organic solvent may be used either alone or as a mixture of two or more organic solvents.

Examples of the organic solid electrolyte may include polyethylene derivatives, polyethylene oxide derivatives, polypropylene oxide derivatives, phosphoric acid acid ester polymers, poly agitation lysine, polyester sulfide, polyvinyl alcohol, polyvinylidene fluoride, and polymers including ionic dissociation groups.

Examples of the inorganic solid electrolyte of the present invention may include nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH and Li$_3$PO$_4$—Li$_2$S—SiS$_2$.

To the liquid electrolyte of the present invention, for example, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride and the like may be added for the purpose of improving charge and discharge properties, flame retardancy and the like. In some cases, halogen-containing solvents such as tetrachlorocarbon or trifluoroethylene may be further included in order to provide nonflammability, carbon dioxide gas may be further included for enhancing a high temperature storage property, and fluoro-ethylene carbonate (FEC), propene sultone (PRS), fluoro-propylene carbonate (FPC) or the like may be further included.

A stack type electrode assembly may be prepared by providing, between a positive electrode plate and a negative electrode plate obtained by cutting the positive electrode and the negative electrode described above to a predetermined size, a separator cut to a predetermined size corresponding to the sizes of the positive electrode plate and the negative electrode plate, and then stacking the result.

Alternatively, a stack and folding type electrode assembly may be prepared by, while providing a positive electrode and a negative electrode to face each other with a separator sheet therebetween, arranging two or more positive electrode plates and negative electrode plates on a separator sheet or arranging two or more unit cells laminating the two or more positive electrode plates and negative electrode plates with a separator therebetween on a separator sheet, and winding the separator sheet or folding the separator sheet to the size of the electrode plate or the unit cell.

Hereinafter, preferred embodiments of the present invention will be described in detail with reference to the accompanying drawings. Such drawings are one embodiment for describing the present invention, and may be implemented in various different forms, and are not limited to the present specification. Herein, in the drawings, parts not relevant to the descriptions are not included, and like reference numerals designate like elements throughout the specification. In addition, sizes and relative sizes of the constituents shown in the drawings are unrelated to actual scales, and may be reduced or exaggerated for clarity of the descriptions.

<Example 1> Preparation of GO/CN Self-Assembled Composite

Figure 1:
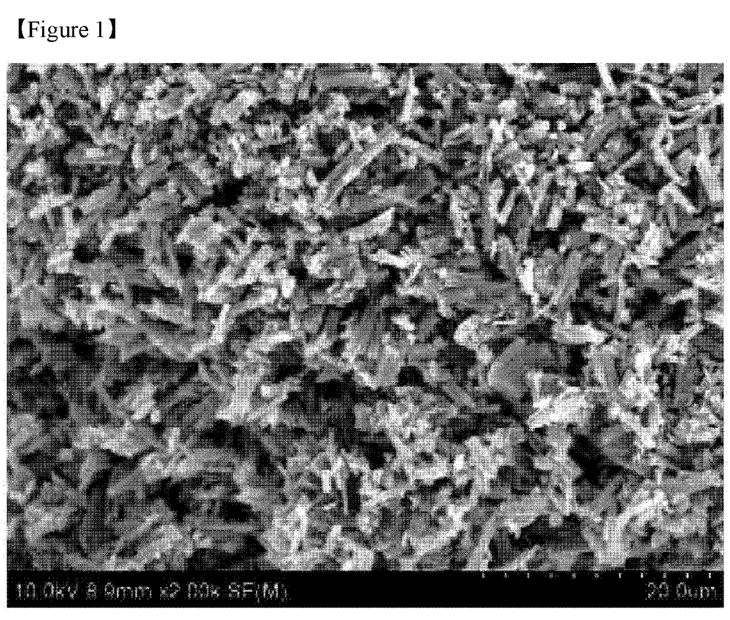
FIG. 1 is a scanning microscope image of a self-assembly of melamine, tri-thiocyanuric acid and graphene oxide according to Example 1 of the present invention.

After dissolving 2 mmol of melamine in 10 mL of DMSO, 2 g of a 2% aqueous graphene oxide solution was added thereto, and 5 mL of a dimethyl sulfoxide (DMSO) solution dissolving 2 mmol of tri-thiocyanuric acid therein was added thereto, and then 15 mL of distilled water was consecutively added thereto to prepare a self-assembly. After that, the prepared self-assembly was washed 3 times with water, and then dried overnight in a 110° C. vacuum oven (shown in FIG. 1).

Figure 2:
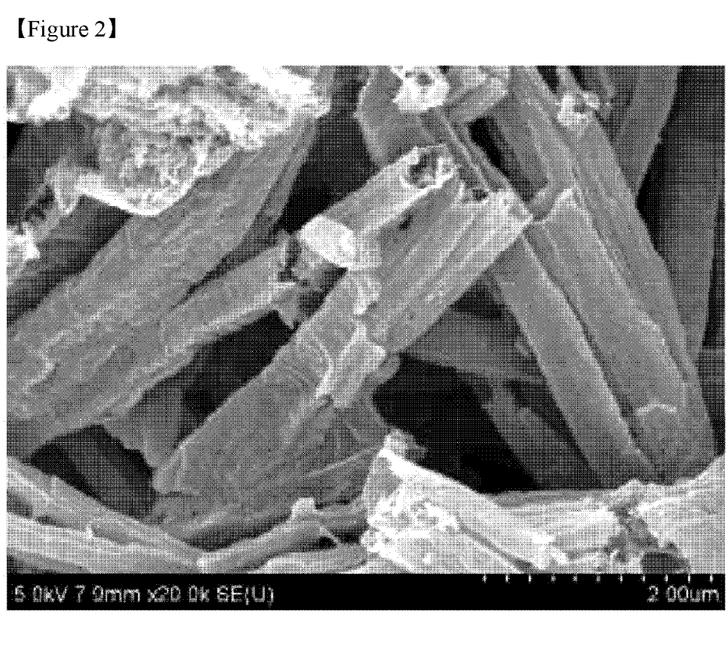
FIG. 2 is a scanning microscope image of a GO/CN self-assembled composite prepared by heat treating a self-assembled composite of melamine, tri-thiocyanuric acid and graphene oxide according to Example 1 of the present invention.

The obtained self-assembly was heat treated for 4 hours at 550° C. while flowing Ar gas, and as a result, a hollow tube-type GO/CN self-assembled composite having a diameter of 200 nm to 1 μm and a length of 2 μm to 10 μm was formed (shown in FIG. 2). A sample of the prepared GO/CN self-assembled composite was collected and BET analyzed, and as a result, a specific surface area of 43 $m^2/g$ and a pore volume of 0.49 $cm^3/g$ were obtained.

<Example 2> Preparation of S-(GO/CN) Composite

In order to composite the GO/CN self-assembled composite prepared in Example 1 and sulfur particles, sulfur was loaded on the GO/CN self-assembled composite at 155° C. in a manner of melt-diffusing the sulfur so that to the weight ratio of S:(GO/CN) became 7:3 to prepare a S-(GO/CN) composite (shown in FIG. 3). As a result, a S-(GO/CN) composite having sulfur coated on the surface of the GO/CN self-assembled composite was formed.

<Comparative Example 1> Preparation of Carbon Nitride (CN)

Figure 4:
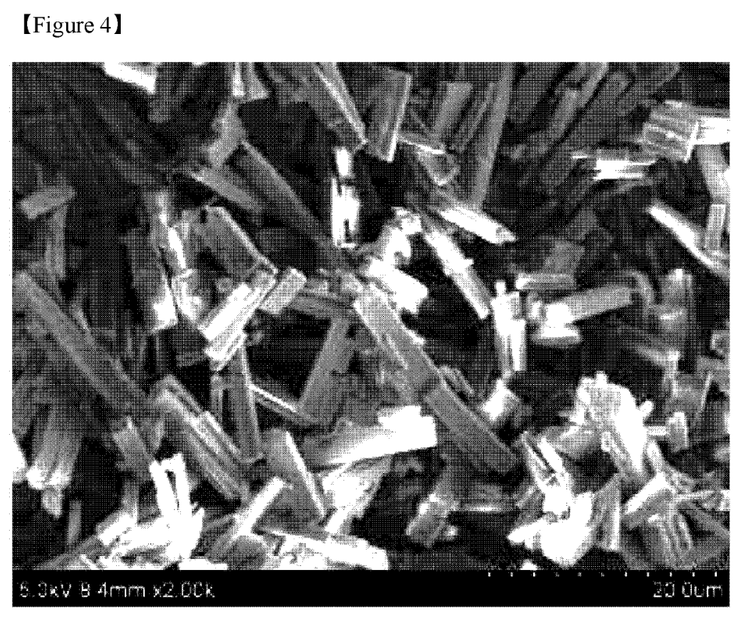
FIG. 4 is a scanning microscope image of a self-assembly of melamine and tri-thiocyanuric acid according to Comparative Example 1 of the present invention.

4 mmol of melamine and 4 mmol of tri-thiocyanuric acid were taken and dissolved in 20 mL and 10 mL of dimethyl sulfoxide (DMSO) solvents, respectively, and after mixing these, 30 mL of water was added thereto to prepare a self-assembly. After that, washing and drying were carried out in the same manner as in Example 1 to obtain a product (shown in FIG. 4).

Figure 5:
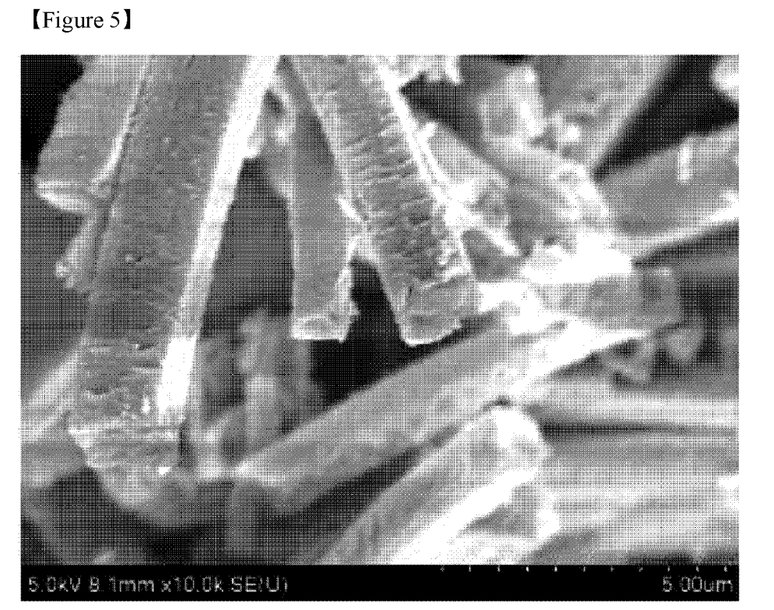
FIG. 5 is a scanning microscope image of carbon nitride prepared by heat treating a self-assembly of melamine and tri-thiocyanuric acid according to Comparative Example 1 of the present invention.

After that, heat treatment was carried out in the same manner as in Example 1 to form carbon nitride (CN) particles in a rectangular-shape having a size of approximately 1 μm×5 μm (shown in FIG. 5).

<Preparation Example 1> Manufacture of Lithium-Sulfur Battery

Slurry having a S/Super-P (9:1):Denka black:CMC/SBR ratio of 80:10:10 was prepared. Using the slurry prepared as above, positive electrode slurry having a loading of 2 mAh/$cm^2$ was coated on aluminum (Al) foil. Using this positive electrode, a lithium-sulfur battery in a CR2032 coin cell-type was manufactured using a liquid electrolyte having a composition of DEGDME:DOL=6:4, 1 M LiFSI and 1% $LiNO_3$. (Herein, CMC is carboxymethyl cellulose, SBR is styrene-butadiene rubber, DEGDME is diethylene glycol dimethyl ether, DOL is dioxolane and LiFSI is lithium bis(fluorosulfonyl)imide.)

<Preparation Example 2> Manufacture of Lithium-Sulfur Battery

In order to use the carbon nitride (CN) prepared in Comparative Example 1 as a positive electrode additive, slurry was prepared so that S/Super-P (9:1):denka black:CN: CMC/SBR ratio became 80:10:5:5. Using the slurry prepared as above, a lithium-sulfur battery was manufactured in the same manner as in Preparation Example 1.

<Preparation Example 3> Manufacture of Lithium-Sulfur Battery

In order to use the GO/CN self-assembled composite prepared in Example 1 as a positive electrode additive, slurry was prepared so that S/SuperP (9:1):denka black:GO/CN self-assembled composite:CMC/SBR ratio became 80:10:5:5. Using the slurry prepared as above, a lithium-sulfur battery was manufactured in the same manner as in Preparation Example 1.

<Preparation Example 4> Manufacture of Lithium-Sulfur Battery

In order to use the S-(GO/CN) composite prepared in Example 2 as a positive electrode active material, electrode slurry was prepared so that S-(GO/CN) composite:denka black:CMC/SBR ratio became 90:5:5, and a lithium-sulfur battery was prepared in the same manner as in Preparation Example 1.

<Experimental Example 1> X-Ray Photoelectron Spectroscopy (XPS) Measurement

For the prepared GO/CN self-assembled composite of Example 1 and the carbon nitride sample of the Comparative Example 1, X-ray photoelectron spectroscopy (XPS) was performed, and C 1s and N 1s spectra and surface elements were analyzed.

Figure 6:
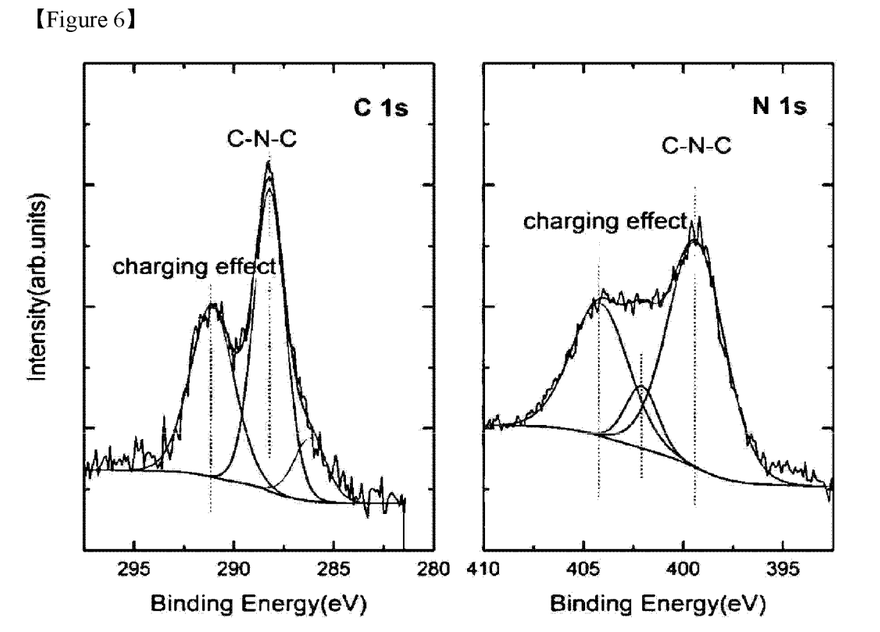
FIG. 6 is an XPS analysis spectrum of carbon nitride according to Comparative Example 1 of the present invention.
Figure 7:
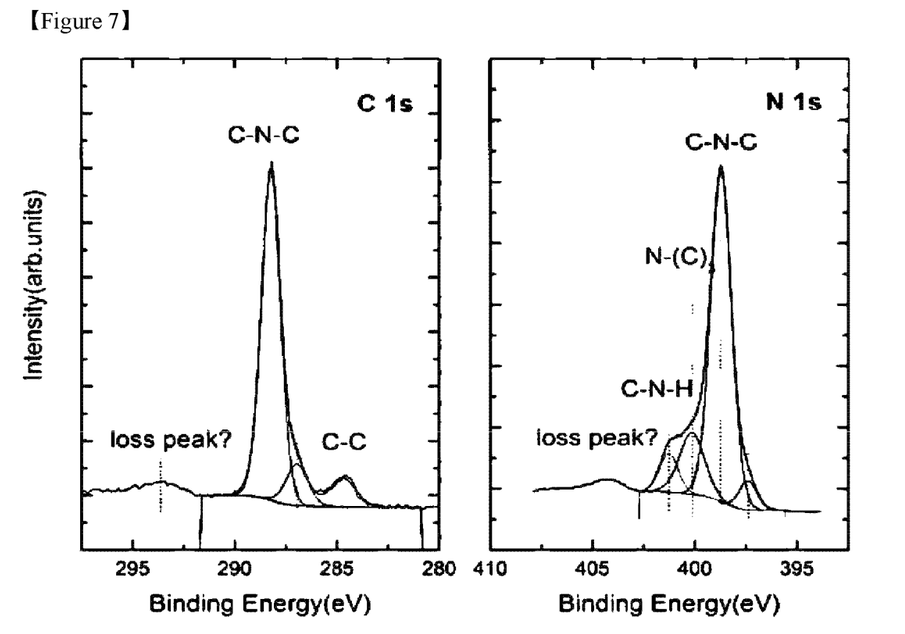
FIG. 7 is an XPS analysis spectrum of a GO/CN self-assembled composite according to Example 1 of the present invention.

First, when referring to the data of FIG. 6 and FIG. 7, an accurate measurement on the carbon nitride of Comparative Example 1 was difficult in the C 1s and N 1s spectra due to a charging effect as shown in FIG. 6. However, through FIG. 7, it was identified that the GO/CN self-assembled composite of Example 1 included C—N—C pyridinic N in large quantities and a charging effect was significantly reduced. Accordingly, it was identified that the GO/CN self-assembled composite of Example 1 had increased conductivity due to graphene oxide.

In addition, results of surface element analyses are shown in the following Table 1.

TABLE 1

| % | C | N | O | S | C/N |
|---|---|---|---|---|---|
| Example 1 | 43.8 | 55.2 | 0.9 | 0.1 | 0.79 |
| Comparative Example 1 | 41.4 | 58.0 | 0.6 | 0 | 0.71 |

A theoretical C/N ratio of graphitic carbon nitride is 0.75, and a value of 0.72 is generally reported due to the bonding of terminal group hydrogen, and when referring to Table 1, the GO/CN self-assembled composite synthesized according to Example 1 was measured to have a value of 0.79, and the carbon nitride (CN) synthesized according to Comparative Example 1 was measured to have a value of 0.71.

<Experimental Example 2> Powder Resistivity Measurement

Figure 8:
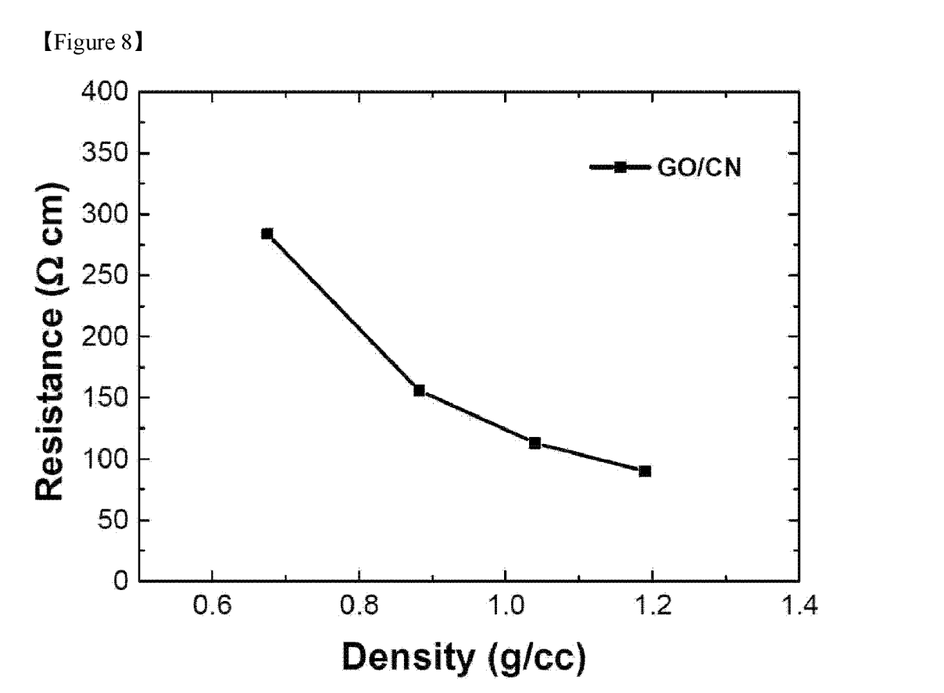
FIG. 8 shows powder resistivity data of a self-assembled composite of a GO/CN self-assembled composite according to Example 1 of the present invention.

Powder resistivity of the GO/CN self-assembled composite of Example 1 and the carbon nitride of Comparative Example 1 was measured. The carbon nitride of Comparative Example 1 had very high resistance of $10^7$ Ω□cm, and it was difficult to obtain a measurement value, however, when referring to data of FIG. 8, the GO/CN self-assembled composite of Example 1 had decreased resistance, and powder resistivity was measured to be 1.13×10² Ω·cm when having density of 1.04 g/cc.

<Experimental Example 3> Discharging Capacity Measurement

Figure 9:
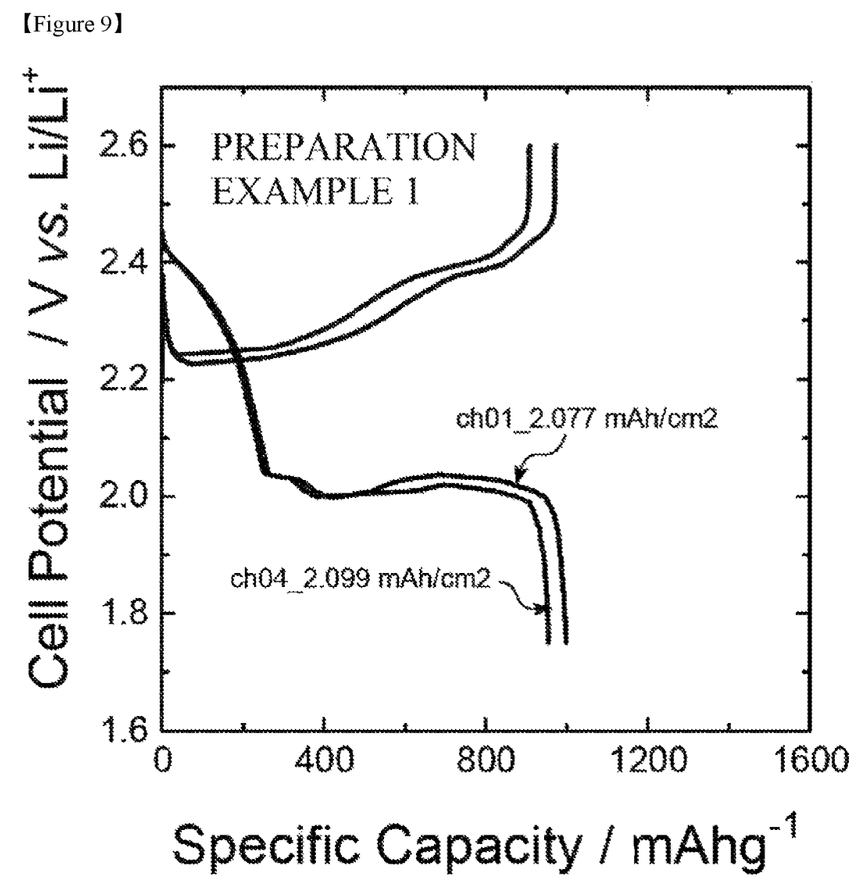
FIG. 9 shows data representing discharging capacity of a lithium-sulfur battery according to Preparation Example 1 of the present invention.
Figure 10:
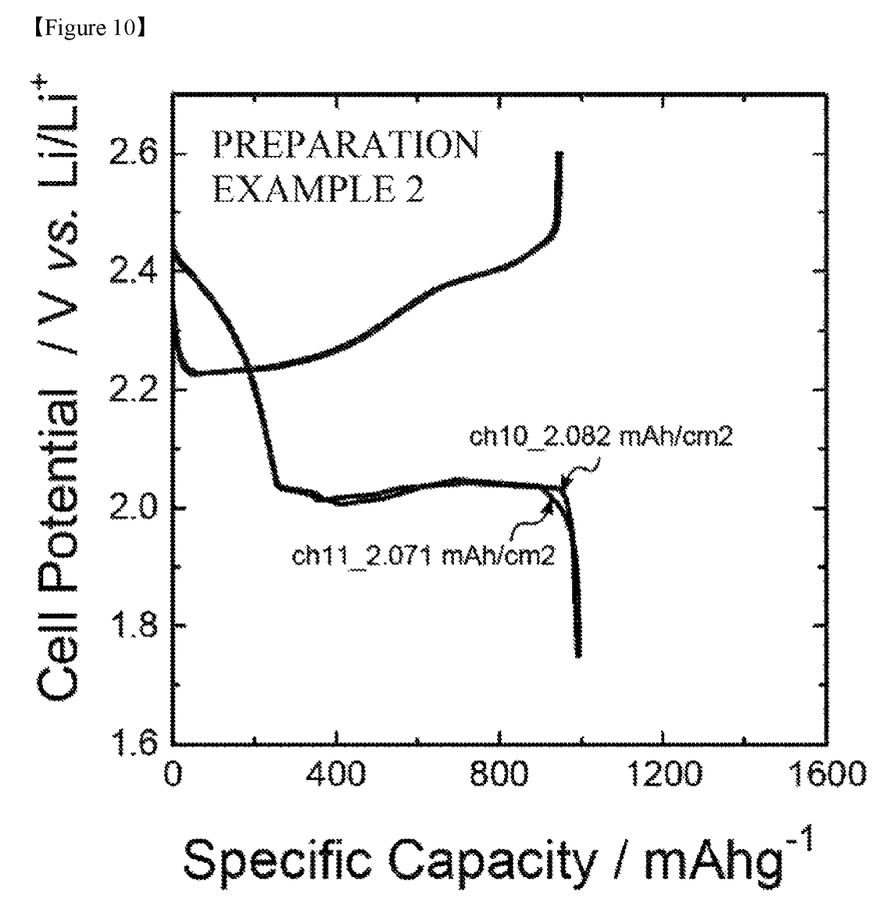
FIG. 10 shows data representing discharging capacity of a lithium-sulfur battery according to Preparation Example 2 of the present invention.
Figure 11:
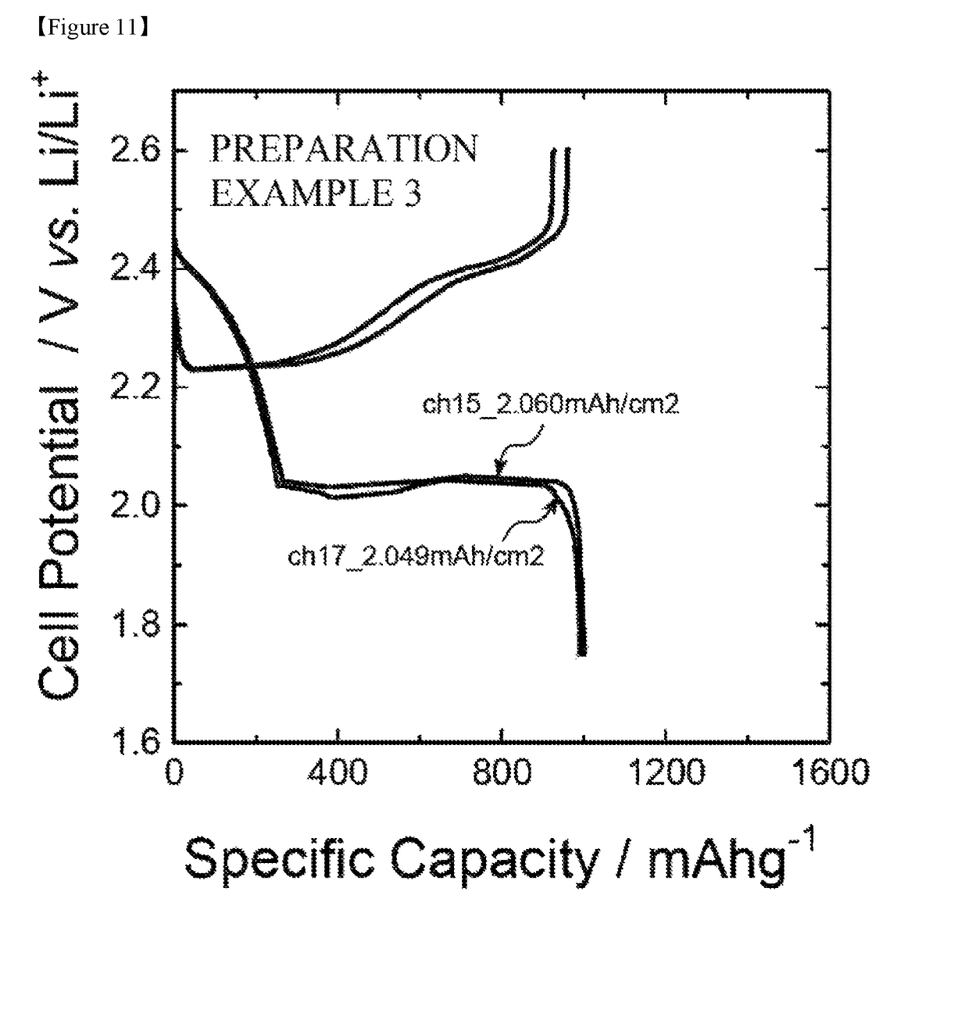
FIG. 11 shows data representing discharging capacity of a lithium-sulfur battery according to Preparation Example 3 of the present invention.

Discharging capacity properties of the lithium-sulfur batteries manufactured in Preparation Examples 1 to 3 were measured (0.1 C/0.1 C), and as a result, when referring to FIG. 9 to FIG. 11, it was identified that discharging capacity generally increased in Preparation Example 2 adding carbon nitride compared to Preparation Example 1, and a discharge overvoltage slightly decreased generally in Preparation Example 3 adding the GO/CN self-assembled composite compared to Preparation Example 1.

Figure 12:
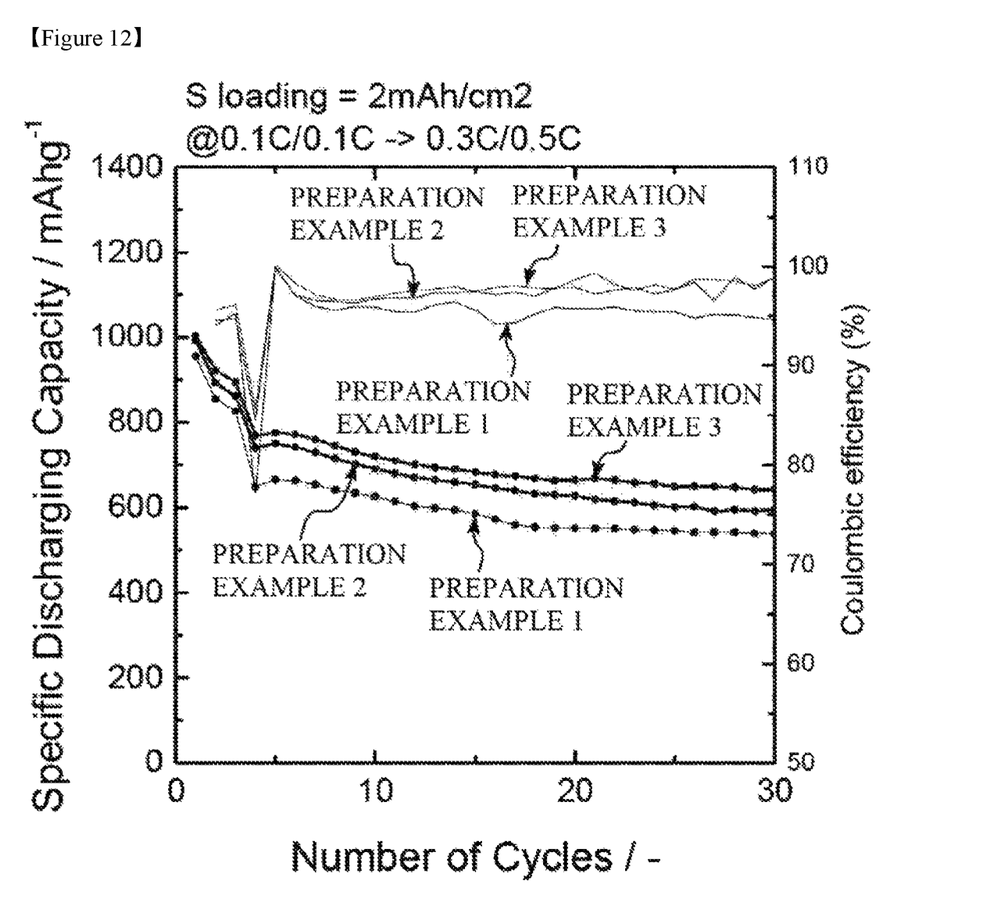
FIG. 12 shows data representing a cycle life property and charge and discharge efficiency of lithium-sulfur batteries according to Preparation Examples 1, 2 and 3 of the present invention.

<Experimental Example 4> Cycle Life Property and Charge and Discharge Efficiency Measurements Cycle life properties (charge and discharge at 0.1 C/0.1 C for 2.5 cycles, and after that, charge and discharge at 0.3 C/0.5 C) and charge and discharge efficiency properties of the lithium-sulfur batteries manufactured in Preparation Examples 1 to 3 were measured, and as a result, when referring to FIG. 12, charge and discharge efficiency of Preparation Example 2 and Preparation Example 3 using carbon nitride was significantly enhanced compared to Preparation Example 1, and particularly, a cycle property was further enhanced in Preparation Example 3 adding the GO/CN self-assembled composite.

<Experimental Example 5> Discharging Capacity Measurement

Figure 13:
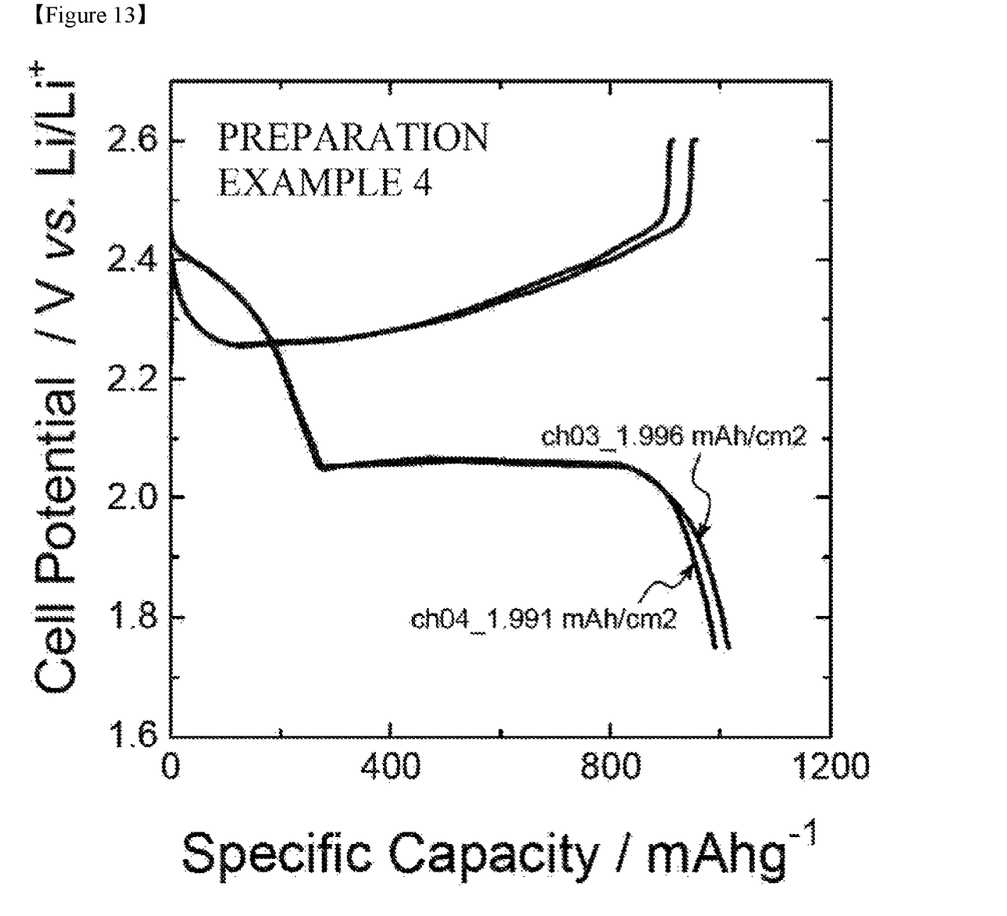
FIG. 13 shows data representing discharging capacity of a lithium-sulfur battery according to Preparation Example 4 of the present invention.

A discharging capacity property of the lithium-sulfur battery manufactured in Preparation Example 4 was measured (0.1 C/0.1 C), and as a result, when comparatively referring to FIG. 9 and FIG. 13, initial discharging capacity was almost similar to Preparation Example 1, and as cycles progressed, discharging capacity generally increased compared to Preparation Example 1.

Figure 14:
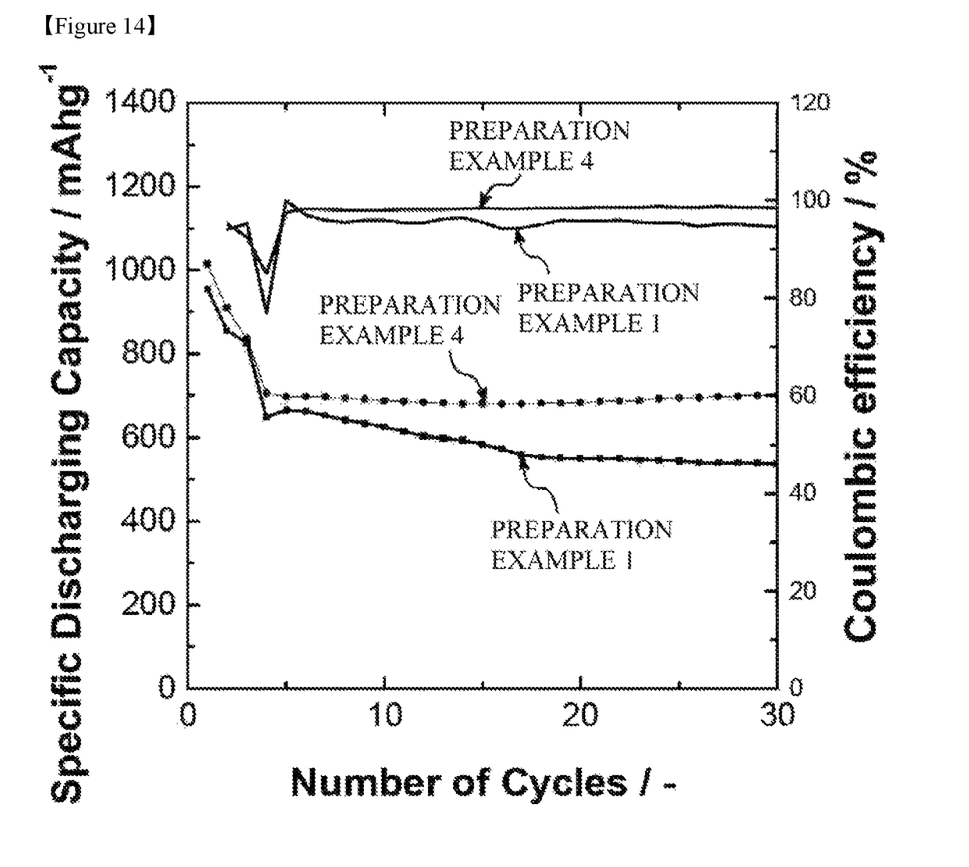
FIG. 14 shows data representing a cycle life property and charge and discharge efficiency of a lithium-sulfur battery according to Preparation Example 4 of the present invention.

<Experimental Example 6> Cycle Life Property and Charge and Discharge Efficiency Measurement A cycle life property (charge and discharge at 0.1 C/0.1 C for 2.5 cycles, and after that, charge and discharge at 0.3 C/0.5 C) and a charge and discharge efficiency property of the lithium-sulfur battery manufactured in Preparation Example 4 were measured, and the results are shown in FIG. 14. It was identified that the lithium-sulfur battery of Preparation Example 4 manufactured using the S-(GO/CN) composite as a positive electrode active material had an excellent capacity retention rate compared to the lithium-sulfur battery of Preparation Example 3 using the GO/CN self-assembled composite as a positive electrode additive, and charge and discharge efficiency was stably maintained as well.

Such results are construed that, an area of contact between sulfur and the GO/CN self-assembled composite increased when using as the S-(GO/CN) composite composited with sulfur compared to when using as a positive electrode additive, and it is more advantageous in terms of adsorbing lithium polysulfide.

The lithium-sulfur battery according to the present invention stably exhibits excellent discharging capacity, output property and capacity retention rate, and therefore, is useful in portable devices such as mobile phones, notebook computers and digital cameras, and in the fields of electric vehicles such as hybrid electric vehicles (HEV).

Accordingly, according to another embodiment of the present invention, a battery module including the lithium-sulfur battery as a unit cell, and a battery pack including the same may be used in various power supply devices such as electric vehicles (EV), hybrid electric vehicles (HEV), plug-in hybrid electric vehicles (PHEV) or systems for power storage.

The invention claimed is:

1. A method for preparing a graphene oxide/carbon nitride self-assembled composite prepared by heat treating a mixed solution dissolving a carbon nitride precursor and graphene oxide,
wherein the carbon nitride precursor is melamine and tri-thiocyanuric acid, and
wherein the graphene oxide/carbon nitride self-assembled composite has a hollow tube-type structure.

2. The method for preparing a graphene oxide/carbon nitride self-assembled composite of claim 1, wherein the carbon nitride precursor is prepared so that a molar ratio of the melamine and the tri-thiocyanuric acid is from 2:1 to 1:2.

3. The method for preparing a graphene oxide/carbon nitride self-assembled composite of claim 1, wherein, when preparing the mixed solution, a solvent is a mixed solvent of dimethyl sulfoxide and water.

4. The method for preparing a graphene oxide/carbon nitride self-assembled composite of claim 3, wherein the dimethyl sulfoxide and the water are mixed in a weight ratio of 2:1 to 1:2.

5. The method for preparing a graphene oxide/carbon nitride self-assembled composite of claim 1, wherein, when preparing the mixed solution, the melamine and the tri-thiocyanuric acid are dissolved in dimethyl sulfoxide, and the graphene oxide is dissolved in water, and then the two solutions are mixed to prepare the mixed solution.

6. The method for preparing a graphene oxide/carbon nitride self-assembled composite of claim 1, wherein the heat treatment is carried out for 1 hour to 10 hours at 400° C. to 700° C.

7. A graphene oxide/carbon nitride self-assembled composite prepared using the method of claim 1.

8. The graphene oxide/carbon nitride self-assembled composite of claim 7, wherein the graphene oxide is included in 1% by weight to 50% by weight with respect to a total weight of the self-assembled composite.

9. A lithium-sulfur battery comprising:
a positive electrode;
a negative electrode;
a separator provided therebetween; and
an electrolyte impregnated thereinto,
wherein the positive electrode comprises
the graphene oxide/carbon nitride self-assembled composite of claim 7; and
sulfur.

10. The lithium-sulfur battery of claim 9, wherein the self-assembled composite and the sulfur either are mixed or form a composited structure.

* * * * *